(12) United States Patent
Godfrin et al.

(10) Patent No.: US 11,703,429 B2
(45) Date of Patent: Jul. 18, 2023

(54) CRYOGENIC TRANSMISSION ELECTRON MICROSCOPY SAMPLE PREPARATION

(71) Applicant: NANOSOFT, LLC., Coventry, RI (US)

(72) Inventors: Michael Godfrin, Narragansett, RI (US); Michael Franzblau, Scituate, RI (US)

(73) Assignee: NanoSoft, LLC, Coventry, RI (US)

( * ) Notice: Subject to any disclaimer, the term of this patent is extended or adjusted under 35 U.S.C. 154(b) by 96 days.

(21) Appl. No.: 17/346,758

(22) Filed: Jun. 14, 2021

(65) Prior Publication Data

US 2021/0310916 A1 Oct. 7, 2021

Related U.S. Application Data

(63) Continuation-in-part of application No. 16/790,367, filed on Feb. 13, 2020, now Pat. No. 11,035,766.

(60) Provisional application No. 62/805,698, filed on Feb. 14, 2019.

(51) Int. Cl.
*G01N 1/42* (2006.01)
*G01N 23/04* (2018.01)

(52) U.S. Cl.
CPC .............. *G01N 1/42* (2013.01); *G01N 23/04* (2013.01); *G01N 2223/102* (2013.01)

(58) Field of Classification Search
CPC ..... G01N 1/42; G01N 23/04; G01N 2223/102
See application file for complete search history.

(56) References Cited

U.S. PATENT DOCUMENTS

| 4,753,887 | A | 6/1988 | Bellare et al. |
| 7,413,872 | B2 | 8/2008 | Frederik et al. |
| 9,312,095 | B2 | 4/2016 | Tripathi et al. |
| 9,355,813 | B2 | 5/2016 | Bose et al. |
| 9,594,008 | B2 | 3/2017 | Carragher et al. |
| 9,702,795 | B2 | 7/2017 | Carragher et al. |
| 9,865,428 | B2 | 1/2018 | Remigy |
| 10,770,265 | B1 | 9/2020 | Mcqueen et al. |
| 10,866,172 | B2 | 12/2020 | Mcqueen et al. |
| 2010/0181495 | A1 | 7/2010 | Lihl et al. |
| 2012/0241607 | A1 | 9/2012 | Bose et al. |

(Continued)

FOREIGN PATENT DOCUMENTS

| EP | 2211163 B1 | 9/2015 |
| EP | 3018467 A1 | 5/2016 |

(Continued)

OTHER PUBLICATIONS

Arnold, et al., "Blotting-Free and Lossless Cryo-Electron Microscopy Grid Preparation From Nanoliter-Sized Protein Samples and Single-cell Extracts", Journal of Structural Biology, vol. 197, Issue 3, 2017, pp. 220-226.

(Continued)

*Primary Examiner* — David Z Huang
*Assistant Examiner* — Jean F Morello
(74) *Attorney, Agent, or Firm* — Cesari and McKenna, LLP; James A. Blanchette

(57) ABSTRACT

A method includes introducing a fluidic sample into the void volume and onto the surface of a porous material, bringing the porous material into contact with a hydrophilic substrate compatible with a cryogenic Transmission Electron Microscope, separating the porous material from the substrate, and transferring a portion of the sample from the porous material to the substrate between their contact and separation.

7 Claims, 26 Drawing Sheets

(56) References Cited

U.S. PATENT DOCUMENTS

| | | |
|---|---|---|
| 2013/0205808 A1 | 8/2013 | Mulders et al. |
| 2017/0004953 A1 | 1/2017 | Glaeser et al. |
| 2019/0170625 A1 | 6/2019 | Nijpels et al. |

FOREIGN PATENT DOCUMENTS

| | | |
|---|---|---|
| EP | 3 062 082 A1 | 8/2016 |
| WO | WO-2013/109406 A1 | 7/2013 |
| WO | 2017005297 A1 | 1/2017 |
| WO | 2017220750 A1 | 12/2017 |
| WO | 2018073242 A1 | 4/2018 |
| WO | 2020171764 A1 | 8/2020 |

OTHER PUBLICATIONS

Bellare, et al., "Controlled Environment Vitrification System: An Improved Sample Preparation Technique", Journal of Electron Microscopy Technique, vol. 10, 1988, pp. 87-111.

Croote, et al., "A Platform for Retaining Native Morphology at Sub-Second Time Scales in Cryogenic Transmission Electron Microscopy", Review of Scientific Instruments, vol. 84, Issue 5, 2013, 6 pages.

Dandey, et al., "Spotiton: New Features and Applications", Journal of Structural Biology, vol. 202, Issue 2, 2018, pp. 161-169.

Drulyte et al., "Approaches to Altering Particle Distributions in Cryo-electron Microscopy Sample Preparation", Acta Crystallographica Section D—Structural Biology Int Union Crystallography, vol. 74, Jun. 2018, pp. 560-571.

Feng, et al., "A Fast and Effective Microfluidic Spraying-Plunging Method for High-resolution Single-Particle Cryo-EM", Structure, vol. 25, Issue 4, Apr. 4, 2017, pp. 663-670.

Jain, et al., "Spotiton: A Prototype for an Integrated Inkjet Dispense and Vitrification System for Cryo-TEM", Journal of Structural Biology, vol. 179, Issue 1, Jul. 2012, pp. 68-75.

McDowall, et al., "Electron Microscopy of Frozen Hydrated Sections of Vitreous Ice and Vitrified Biological Samples", Journal of Microscopy, vol. 131, Issue 1, Jul. 1983, pp. 1-9.

Noble, et al., "Reducing Effects of Particle Adsorption to the Air-Water Interface in CryoEM", Nature Methods, vol. 15, Issue 10, Oct. 2018, 10 pages.

Razinkov, et al., "A New Method for Vitrifying Samples for CryoEM", Journal of Structural Biology, vol. 195, 2016, pp. 190-198.

Klebl et al., "Need for Speed: Examining Protein Behavior During Cryoem Grid Preparation at Different Timescales", Structure, vol. 28, Issue 11, Nov. 3, 2020, pp. 1238-1248.

Klebl et al., "Sample deposition onto cryo-EM grids: from sprays to jets and back", Acta Crystallographica Section D, Structural Biology, vol. 76, Apr. 2020, pp. 340-349.

Ravelli et al., "Cryo-em Structures From Sub-nl Volumes Using Pin-printing and Jet Vitrification", Nature Communications, vol. 11, May 22, 2020, pp. 1-9.

"European Search Report and Written Opinion," European Application No. 22178759.1-1001, Applicant: Nanosoft, LLC, dated Nov. 2, 2022, pp. 1-9.

us 11,703,429 B2

CRYOGENIC TRANSMISSION ELECTRON MICROSCOPY SAMPLE PREPARATION

CROSS REFERENCE TO RELATED APPLICATIONS

This application is a continuation-in-part of U.S. patent application Ser. No. 16/790,367, filed Feb. 13, 2020, which claims benefit from U.S. Provisional Patent Application Ser. No. 62/805,698, filed Feb. 14, 2019, which are incorporated by reference in their entirety.

STATEMENT REGARDING GOVERNMENT INTEREST

This invention was made with government support under Grant No. NSF 1746430 awarded by the National Science Foundation. The government has certain rights to the invention.

BACKGROUND OF THE INVENTION

The present invention relates generally to Transmission electron microscopy, and more particularly to cryogenic transmission electron microscopy sample preparation.

In general, Transmission electron microscopy (TEM) is a microscopy technique whereby a beam of electrons is transmitted through an ultra-thin specimen such that the electron beam interacts with the specimen as it passes through. The interaction of the electrons transmitted through the specimen in turn creates an image. This created image is then magnified and focused onto an imaging device, such as a fluorescent screen, a layer of photographic film, or is detected by a sensor such as a CCD camera. The benefit is that TEM systems are capable of imaging at a significantly higher resolution than traditional light microscopes due to the small wavelength of electrons. This enables the instrument's user to examine sample features with atomic-level resolution, which is thousands of times more powerful than light microscopes.

TEM forms a major analysis method in a range of scientific fields, in both physical and biological sciences. TEM specimens must be prepared on gridded substrates, which are loaded into a sample holder. Usual grid substrate materials are copper, molybdenum, gold or platinum. The sample holder can then be inserted into the TEM column which is under vacuum; in the column the holder pairs with a specimen stage which allows for translation and rotation of the sample. A wide variety of designs of stages and holders exist, selection of which depends on the type of specimen and experiment.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including introducing a fluidic sample onto or into hydrophilic porous material, bringing the porous material into contact with a hydrophilic substrate compatible with a cryogenic Transmission Electron Microscope, separating the porous material from the substrate, and transferring a portion of the sample from the porous material to the substrate between their contact and separation.

In another aspect, the invention features a method including loading a hydrophilic porous material with a volume of fluidic sample wherein the fluidic sample fills a portion of the void space and covers a portion of the surface of the hydrophilic porous material, processing a substrate for cryo-Transmission Electron Microscope samples to be rendered hydrophilic, bringing the porous material into contact with a surface of the substrate, causing a volume of sample transferred from the hydrophilic porous material to the substrate, separating the porous material from the surface of the substrate, and plunging the substrate into a liquid cryogen for sample vitrification.

In another aspect, the invention features a method including bringing a hydrophilic porous material into contact with a hydrophilic substrate for cryo-Transmission Electron Microscope samples, introducing a fluid sample into the porous material where the sample wicks into the porous material and into contact and across the surface of the substrate and between the substrate and porous material, separating the substrate from the porous material shearing the fluidic sample between the two and leaving the appropriate volume of sample on the substrate for vitrification and plunging the substrate into a liquid cryogen.

In another aspect, the invention features a method including bringing a hydrophilic porous material in contact with a hydrophilic substrate for cryo-Transmission Electron Microscope samples but leaving a portion of the substrate open to the environment, introducing a fluidic sample onto the open portion of the substrate, allowing the sample to wick across the substrate and into contact with the porous material which wicks the sample through its pores and between the substrate and porous material, separating the substrate and porous material shearing the sample between the two and leaving the appropriate volume of sample on the substrate for vitrification and plunging the substrate into liquid cryogen.

In another aspect the invention features a method including applying fluidic sample to the sample of a hydrophilic TEM substrate and swiping it by a hydrophilic porous material, removing the appropriate volume of sample for vitrification, en route in plunging into a liquid cryogen for sample vitrification.

In still another aspect the invention features a method of bringing a hydrophilic porous material into contact with a hydrophilic substrate for cryo-Transmission Electron Microscope samples, locking them into position relative to each other, introducing a fluidic sample into the porous material and allowing it to wick through the porous material and onto and across the surface of the substrate, plunging the substrate and porous material towards a liquid cryogen, unlocking their motion relative to each other and stopping the porous material at the surface of the liquid cryogen, continuing the plunge of the substrate away from the porous material shearing the fluidic sample between them leaving the appropriate volume of sample for vitrification on the substrate and plunging the substrate into the liquid cryogen vitrifying the sample.

In still another aspect, the invention features a method including a blotless technique for depositing fluidic sample onto a substrate for cryo-Transmission Electron Microscope.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
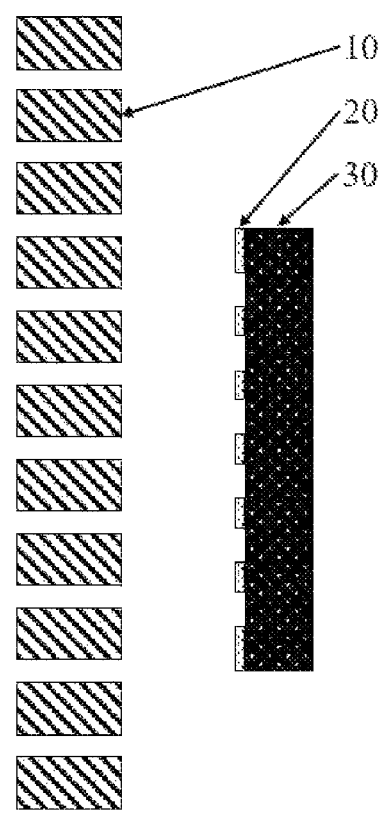
FIG. 1 is a side view showing the porous material and the TEM sample substrate before contact.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is a process for preparing samples for cryogenic transmission electron microscopy. A fluidic sample is introduced onto the surface of and/or into the void volume of a hydrophilic porous material. The porous material is brought into contact with a hydrophilic substrate compatible with a cryogenic Transmission Electron Microscope. The porous material is then separated from the substrate, and between contact and separation a portion of sample is transferred from the porous material to the substrate. Upon separation of the porous material and the substrate, the deposited volume of sample now on the substrate is vitrified by plunging the substrate into a cryogen. The volume deposited is appropriate for vitrification for cryo-TEM imaging, eliminating the need to remove excess sample volume, a practice ubiquitous in cryo-TEM sample preparation.

Cryogenic Transmission Electron Microscopy (cryo-TEM) relies on cryogenic sample preparation of fluidic samples prior to imaging with a TEM, which synergistically provides native images of hydrated materials (e.g., proteins, enzymes, nanomaterial suspensions, etc.) with the resolution advantages of TEM. Cryogenic sample preparation requires the vitrification of the fluidic material, where vitrification is the freezing of a water-based sample fast enough such that water molecules do not crystallize but rather remain amorphous. Crystallization of water results in damage to the molecules/particles/nanomaterials of interest in solution or suspension and result in poor images due to water crystals. The ubiquitous method used to vitrify samples for cryo-TEM has been to pipette fluidic sample onto a TEM sample grid, blot the grid with blotting paper for a finite time period to remove excess sample, and then quickly plunge the grid into a liquid cryogen. The blot is used to reduce the sample volume on the grid (generally to a layer 100 nm thick) such that the heat transfer rate from the sample fluid to the cryogen vitrifies the sample fluid.

The blotting process entails pushing a porous blotting paper against the TEM grid, on which a droplet of sample resides. Sample fluid volume from the droplet wicks through the pores of the blotting paper, removing fluid volume from the TEM grid where the fluid sample volume displaces air within the pores of the paper. The removal of fluid from the grid through the blot is a function of many parameters, including the type of blotting paper used, pre-saturation of blotting paper due to humidity in the ambient environment, force with which the blotting paper is applied against the sample, sample properties, etc. These parameters must be set appropriately such that a layer of sample on the grid is left behind with a thickness of 100 nm, with the optimal layer thickness being dependent on the sample being analyzed.

Studies generally rely on multiple replicates of data to build confidence in observations; therefore, multiple TEM grids are conventionally prepared for imaging. This is especially important for Single Particle analysis with cryo-EM, whereby thousands of replicates of a biomacromolecule are captured in images in a variety of random orientations and those 2D images of the biomacromolecule compiled to create a 3D model of the molecular structure. Good repeatability of the blotting process is important so that when blotting parameters are set to prepare grids, the user can be confident that using those same parameters will provide similar, well-vitrified grids when repeating the process. This is important because a large amount of funds, time and effort are spent in the purification of biomacromolecules before cryo-TEM sample preparation can even occur; small volumes of these samples are incredibly valuable and difficult to achieve so poor grids are a large waste of funds and time. Unfortunately, it has been reported that the blotting process is not repeatable. Even commercially-available blotting-based sample preparation robots, which have been developed to offer improved blotting control and repeatability, have been reported to not be repeatable; subsequent samples prepared on the same machine with the same sample material and same blotting parameters, within minutes of each other, can still result in completely different vitrification results. Because of this poor repeatability, and the expense of, and demand for, time for use of high end data collection TEM's, it is generally required that researchers use lower end TEM's and optimize blotting conditions on those "screening TEMs" before imaging samples with a high end TEM; this increases the probability that samples prepared with the optimized parameters will provide quality images that allow for the high resolution creation of a 3D model of the target biomacromolecule. The inefficiency of blotting results in the need for additional screening TEM's (both their purchase and maintenance) and the additional use of valuable sample volume and researcher time to optimize those parameters. It has been reported that some samples have required multiple years in optimization of cryo-TEM sample preparation, clearly showing that new cryo-TEM sample preparation technologies are required to drive cryo-EM to a high throughput technique.

Other major issues with blotting-based cryo-TEM sample preparation exist. As stated, biomacromolecule samples (often proteins or protein complexes) are incredibly expensive to synthesize; it requires complex processing and often results in small volumes with which imaging can be conducted. Blotting-based cryo-TEM sample preparation has required users to deposit ~3-5 µL of sample onto the grid by pipetting and the blotting process results ideally with ~100's pL remaining on the grid. This means more than 99.9% of the valuable sample is blotted away from the grid, which cannot be recovered or used again. Sample preparation techniques that can minimize the amount of sample waste would be of huge benefit for cryo-TEM.

Furthermore, blotting-based sample preparation has required time scales on the order of seconds. For single particle cryo-EM, each biomacromolecule particle (often a protein or protein complex) must be randomly oriented throughout the sample in order to ascertain images of a variety of perspectives of the protein. This variety of two dimensional perspectives provides the ability to construct a three dimensional model of the protein. It has been reported that many proteins will move to the air/water interface, adsorbing to the interface with a preferred orientation, which reduces the number of randomly orientated particles and the ability to calculate a model of the 3D protein structure. It has been reported that if the time interval between the creation of the air/water interface of the sample on the TEM substrate and vitrification is maintained at equal to or less 100-250 msec, the particles will have significantly less ability to move to the air/water interface and adopt a preferred orientation. Furthermore, faster sample preparation will allow for better temporal resolution for studies into dynamic processes, such as biological interactions, e.g. protein-protein binding, or other chemical processes, e.g. reaction intermediates in mixing. There is certainly a major benefit to reducing the time between sample deposition and vitrification when preparing a sample for cryo-TEM.

Blotless techniques generally suggest that the sample is applied to the grid with a volume small enough that the sample can be vitrified without removal of any excess volume post deposition. Several blotless spray-techniques have been developed and reported upon. With these technologies picoliter to nanoliter volumes of sample are ejected onto the TEM grid prior to vitrification. The ejection has been driven mechanically with piezoelectric pump heads and with pneumatics. These systems eject an appropriate amount of sample, such that removal of excess sample volume is not required. These systems also claim to reduce time from sample interface formation to vitrification such that interfacial adsorption of particles is reduced. These systems utilize fluidic channels to guide the sample fluid and although volumes are dispensed onto the grid that are appropriate for vitrification without blotting, the systems generally require much higher volumes (~1 uL) to work in the practical manifestation of the system. These systems are also very complex and result in systems that are very expensive to manufacture and purchase. These complex systems also only use one spray head, which results in only a small fraction of the grid being covered with sample and fewer potential good areas of vitrified sample ice to capture images. If there is a desire to cover the entire grid, more complexity will be required for the system. Furthermore, they require complex machinery, which results in a large system, which is often difficult to house in sample preparation laboratories that exist in Electron Microscopy facilities. Therefore, there will be a need for additional forms of blotless sample preparation.

There is another type of blotless cryo-TEM sample preparation that utilizes a microcapillary to deposit sample onto the TEM grid. Two processes are utilized with the microcapillary to deposit sample onto the grid. One entails a microcapillary tube into which sample fluid volume is aspirated. The tip of the tube is brought close to the TEM grid and a high-precision pump pushes the fluid sample forward such that a ~20 nL "droplet" protrudes from the tip of the microcapillary tube. The droplet contacts the grid and there can be relative motion to get the sample to spread across the grid surface. The droplet is then reaspirated into the microcapillary tube and the grid is plunged for vitrification. The reaspiration results in reduced waste from sample preparation. The second process entails dipping a microcapillary pin into the fluid sample, which when subsequently removed carries a small volume of sample fluid on its surface; the pin tip is then brought into contact with the surface of the TEM grid and written across the surface, transferring sample volume onto the TEM grid. The sample is then plunged into cryogen and vitrified. In both processes a laser and photodiode are utilized to monitor sample layer thickness on the grid post-deposition with the microcapillary; evaporation under controlled temperature is monitored and allowed to occur until sample thickness is measured to be appropriate and is then vitrified. Evaporation can have negative impacts on fluidic samples; it can alter salt concentrations and particle concentrations, which can lead to conformational and/or structural changes. Furthermore, controlled evaporation monitoring systems add complexity to the sample preparation process and can lead to higher manufacturing costs. Therefore, additional blotless cryo-TEM sample preparation techniques will be of interest.

The present invention is a blotless technique for depositing fluidic sample onto a substrate for cryo-TEM. A hydrophilic porous material is loaded with a volume of fluidic sample, whereby the sample fills some portion of the void space and covers some part of the surface of the porous material. Introduced fluidic sample volume can match the void space of the porous material, filling up to 100% of the void space of the porous material or even exceed the void space volume, with the sample volume in excess of void volume sticking to/wetting the material surface. Separately, a substrate for cryo-TEM samples is processed to be rendered hydrophilic. The porous material is brought into contact with the surface of the hydrophilic sample substrate. Upon the porous material and sample substrate making contact, there can be shearing motion between the surfaces. The porous material and sample substrate are then separated; this separation can occur in any way, whether normal to the substrate surface or parallel (shear). Due to the hydrophilic nature of the sample substrate, a volume of sample is transferred from the porous material to the substrate. This transfer may occur during the initial contact, relative shearing action between the porous material and substrate (if conducted), and/or separation of the porous material and substrate. The properties of the TEM substrate (geometry, hydrophilicity, etc.), porous material (void space, material, thickness, etc.) and transfer process (with shear or without shear, normal or shear separation between substrate and porous material, volume of sample inserted into porous material) can be set appropriately for the properties of the sample of interest such that a volume is transferred to the substrate that is appropriate for vitrification without any removal of excess sample volume. After separation of the surfaces, the substrate is plunged into a liquid cryogen for sample vitrification.

This present invention also includes bringing a hydrophilic porous material into contact with the hydrophilic TEM substrate prior to sample loading. A surface of a hydrophilic porous material is brought into contact with a surface of the hydrophilic TEM substrate. The fluid is then introduced into a side of the porous material opposite or adjacent to side in contact with the TEM substrate. The fluid sample wicks through the porous material and into contact with the surface of the TEM substrate, wetting the substrate surface. The substrate is then separated from the porous material, shearing the fluidic sample between the TEM substrate and the porous material, and leaving the appropriate amount of sample on the TEM substrate and simultaneously creating a new air/water interface for the sample residing on the TEM substrate. The TEM substrate is then plunged into liquid cryogen and the sample is vitrified. This works for any TEM substrate type, porous material type, fluid sample volume or sample type, and normal or shear contact or separation between substrate and porous material. This invention also includes having the separation motion being the plunge motion that drives the substrate into the liquid cryogen, i.e. in one motion separating the porous material and substrate and plunging the substrate into the cryogen, which minimizes the time between creation of the air/water interface of the fluidic sample and vitrification.

This present invention also includes bringing a hydrophilic porous material into contact with a hydrophilic TEM substrate, with a portion of the surface of the substrate in contact with the porous material not being in contact with the porous material. A fluidic sample is then introduced onto the portion of the surface of the TEM substrate that is not in contact with the porous material. The fluidic sample spreads across the surface of the TEM substrate and through spreading also comes into contact with the porous material. The fluidic sample then wicks into the porous material, and also spreads across the TEM substrate and between the porous material and TEM substrate. The substrate is then separated from the porous material, shearing the fluidic sample between the substrate and porous material and leaving an appropriate volume of sample on the substrate for vitrification, and plunged into liquid cryogen and vitrifying the fluidic sample. For this invention the fluidic sample can be introduced at the corner where the substrate and porous material begin to contact, inducing wicking into the porous material and spreading across the substrate at the same time.

This present invention also includes introducing a fluidic sample onto the surface of a hydrophilic TEM substrate and swiping across a porous material en route to a liquid cryogen for sample vitrification. Fluidic sample is introduced onto the substrate and is swiped in shear across the surface of a porous material. As the substrate swipes across the surface of the porous material, fluidic samples wicks into the porous material, and the substrate moves past the porous material and into liquid cryogen for sample vitrification. This invention is significantly different than the traditional blotting used to thin fluidic samples prior to vitrification for cryoEM sample preparation. With traditional blotting the substrate with sample on the surface has been pressed against a porous material with forces normal to the surface of the substrate. Most of the fluidic volume is wicked into the porous material, and the porous material is separated in the normal direction away from the substrate, prior to the substrate plunging into liquid cryogen. The sample remaining on the substrate is appropriate for sample vitrification. The sample volume used is typically 3 uL. With this invention an order of magnitude less sample is applied to the grid (~500 nL) and is moved along one axis across the porous material, removing excess sample, and then into the liquid cryogen. The grid swipes in shear across the porous material with significantly less normal force pressing the porous material against the substrate. The appropriate sample volume is removed for sample vitrification, but the porous material isn't separated normally/perpendicularly from the substrate prior to plunging the sample quickly into liquid cryogen. The substrate continues along its axis of motion from its shear across the porous material and quickly plunged into liquid cryogen.

This present invention also includes plunging the porous material and TEM substrate in sync towards the liquid cryogen and stopping the porous material before the surface of the liquid cryogen while the substrate plunges into the cryogen vitrifying the sample. A hydrophilic porous material is attached to a carriage, where the porous material is fixed to the carriage and is moved only through carriage motion. A hydrophilic TEM substrate is held such that its surface is parallel to a surface of the porous material, and the substrate surface is coincident to the surface of the porous material. The mechanism holding the TEM substrate does so such that the substrate is fixed and only moved through motion of a carriage, to which the mechanism holding the TEM substrate is fixed. The carriage directing the substrate and the carriage directing the porous material can move independently of each other or their motion can be synchronized. The substrate is brought into contact with the porous material and the carriages holding each of them are then locked for synchronized motion. A fluidic sample is introduced into a side of the porous material opposite or adjacent to the side contacting the substrate. The sample then wicks through the porous material and contacts and spreads across the substrate surface. The synchronized carriages holding the substrate and porous material then plunge towards a liquid cryogen. The motion of the two carriages is unsynchronized when the porous material is at the surface of the liquid cryogen, at which point the porous material is immediately stopped. The substrate then plunges away from the porous material and into the liquid cryogen, shearing the fluidic sample between the porous material and substrate, leaving a sample volume on the substrate appropriate for vitrification and creating a new air/water interface just before entering the cryogen. This invention also covers stopping the porous material gradually to separate from the substrates. It also covers separating and/or unsynchronizing the porous material from the substrate before contacting the surface of the liquid cryogen or even after penetrating the surface of the liquid cryogen. It also includes synchronizing the porous material and substrate with a portion of the substrate out of contact with the porous material and introducing the sample onto the surface of the substrate and allowing it to spread across the substrate and wick into the porous material prior to synchronized plunging toward the cyrogen.

Similarly, this invention also covers a synchronized plunge of the porous material a hydrophilic TEM substrate with the fluidic sample deposited on it. In this case the sample is deposited onto the substrate and brought right above the porous material in the axis of the plunge towards the liquid cryogen. At that position the motion of the porous material carriage and the substrate carriage are locked/synchronized. They plunge towards the liquid cryogen and the motion becomes unsynchronized just as the porous material is stopped right above the surface of the cryogen. The substrate then plunges across the porous material, removing the amount of fluid sample volume required or vitrification, and into the liquid cryogen. This process works equally as well with the pre-loaded grid moving into contact with the paper, starting the sample wicking process, locking the motion of the two carriages, plunging towards cryogen, and stopping the porous material and unsynchronizing right at the surface of the cryogen. It also works with the porous material stopping above the surface of the ethane or even into the liquid ethane.

Referring now to the drawings, in their simplest description a porous material is a material that contains pores or voids. The material is comprised of a matrix within or throughout which the void space is located. In many cases the matrix is a continuous, solid material, though the matrix can also be comprised of discrete particles of fibers. The pore space is often filled with air or gas, but can also be filled with other fluids.

For purposes of this invention, the void space is continuous throughout the matrix; as studied in percolation theory, this allows for fluid to flow from one side through a continuum to the other side of the material. Porous materials, include, but are not limited to: paper, filters, sponges, soil, rock, bone, cork. Porous materials are complex and therefore can be modeled or represented in a variety of ways. To describe this invention, the porous material is shown in two dimensions with channels through the cross section/thickness of the matrix, where the channels can represent the void space of the porous material that can be filled with fluidic sample. This invention is however equally applicable to any type of hydrophilic porous material, whether natively or rendered as such.

Referring to the TEM sample substrate, generally cryo-TEM samples are deposited onto a TEM grid. The sample is deposited onto a thin carbon film, which is bound to and spread across a grid (film and grid together are colloquially referred to as the TEM grid). The grid component provides mechanical, structural stability while undergoing the sample preparation processes. The grid structure is ~3 mm in diameter and approximately 10-100 μm thick and is manufactured to be a grid pattern across the majority of the structure. While providing structure, the grid is also mostly empty space through which electrons can travel. The carbon film provides a relatively inert structure onto which the sample is deposited, while also allowing electrons to transfer through the film relatively easily; for cryo-TEM the film often contains holes into which the fluidic sample can deposit. The carbon film and substrate are generally rendered hydrophilic utilizing plasma treatment to encourage spreading of the sample across the carbon film surface. This invention is equally applicable to any substrate that is hydrophilic, whether natively or rendered as such, and whether of a grid/film architecture or not. It is also equally applicable to any type of grid material, generally a metal such as copper, gold or nickel, and any thin film used to frame vitrified sample for TEM imaging.

Referring to the sample, it is generally described here as being fluidic. Many samples for cryo-TEM are suspensions or colloids of particles that are dilute enough to behave like a fluid, generally meaning that they have no resistance to shear stress and under which they will continually deform, or flow. This invention is equally applicable to any fluidic sample with any concentration of any single or multitude component particles, including proteins, viruses, or other biomolecules, polymers, inorganic particles, and so forth, that will wet, and wick into the pore space of, a hydrophilic porous material.

In FIG. 1, a porous material 10 is depicted in two dimensions as a material with channels running parallel through the material's thickness. Porous materials are complex, so to describe this invention, the porous material is depicted here as a matrix in 2D with channels through the cross section/thickness, rather than a complex three dimensional depiction. In this initial state the pores are empty, filled with ambient air. FIG. 1 depicts the porous material as a flat sheet, however the present invention applies equally to any geometry of porous material. A carbon film 20 is attached to the TEM grid 30. The carbon film and TEM grid are rendered hydrophilic.

Figure 2:
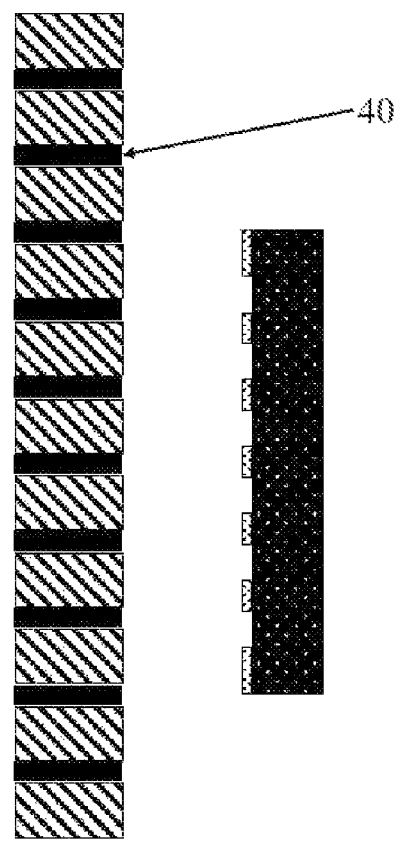
FIG. 2 is a side view showing the porous material with fluidic sample volume introduced into the void space along with the TEM sample substrate, before contact.

In FIG. 2, a volume of sample is deposited into the porous material. The sample volume 40 occupies some portion of a void space in the pores of the porous material. For ease of depiction sample volume is only shown as occupying some portion of the void volume, however sample also covers some portion of the surface of the porous material. FIG. 2 shows a porous material loaded with a sample volume approximately equal to the void space, however, the present invention is equally applicable to any sample volume up to the volume of the void space (100% of void space is full, i.e., porous material is saturated), or a volume of sample even larger than the void space (porous material is over-saturated).

Figure 3:
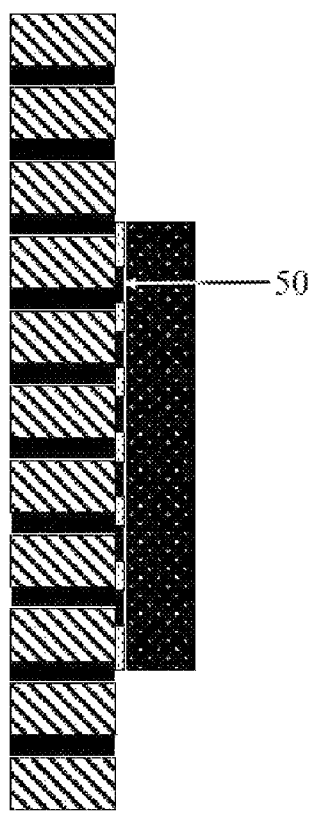
FIG. 3 is a side view showing contact and the transfer of sample from the porous material containing sample to the TEM sample substrate.

In FIG. 3, the porous material is brought into contact with the TEM grid on the carbon film side. This shows the porous material contacting flat onto the carbon, however the present invention applies equally to any contact type, such as the edge of the porous material contacting the carbon. As contact occurs, there may be shearing motion between the porous material and TEM substrate to encourage transfer of sample onto the carbon film. During contact there is sample volume that is transferred from the porous material to the TEM grid 50. Some sample may have sheared completely away from the porous material, and some sample volume may be in contact with both porous material and TEM substrate.

Figure 4:
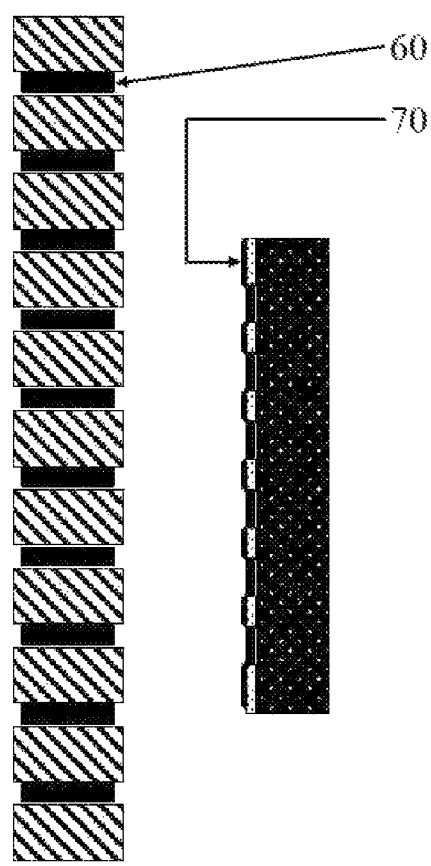
FIG. 4 is a side view showing the TEM sample substrate with transferred sample on the surface before being plunged into a liquid cryogen.

In FIG. 4, the porous material is separated from the TEM substrate. The sample volume 60 in the porous material is now less than the original sample volume 40 (FIG. 2), as a portion has been transferred to the TEM substrate 70. The objective is to transfer ~100's pL to ~1 nL of sample onto the TEM grid to achieve an appropriate sample layer thickness for vitrification. It should be noted that volumes depicted being transferred/deposited in the figures may be exaggerated and are for conceptual understanding only. The present invention does apply equally to any sized geometry of porous material, material porosity, porous material type, void space volume, sample volume and so forth. Additionally, sample volume 7 is depicted as having a uniform thickness across the carbon film and pores in the film, however the present invention will often lead to variation in the sample thickness across the grid.

Figure 5:
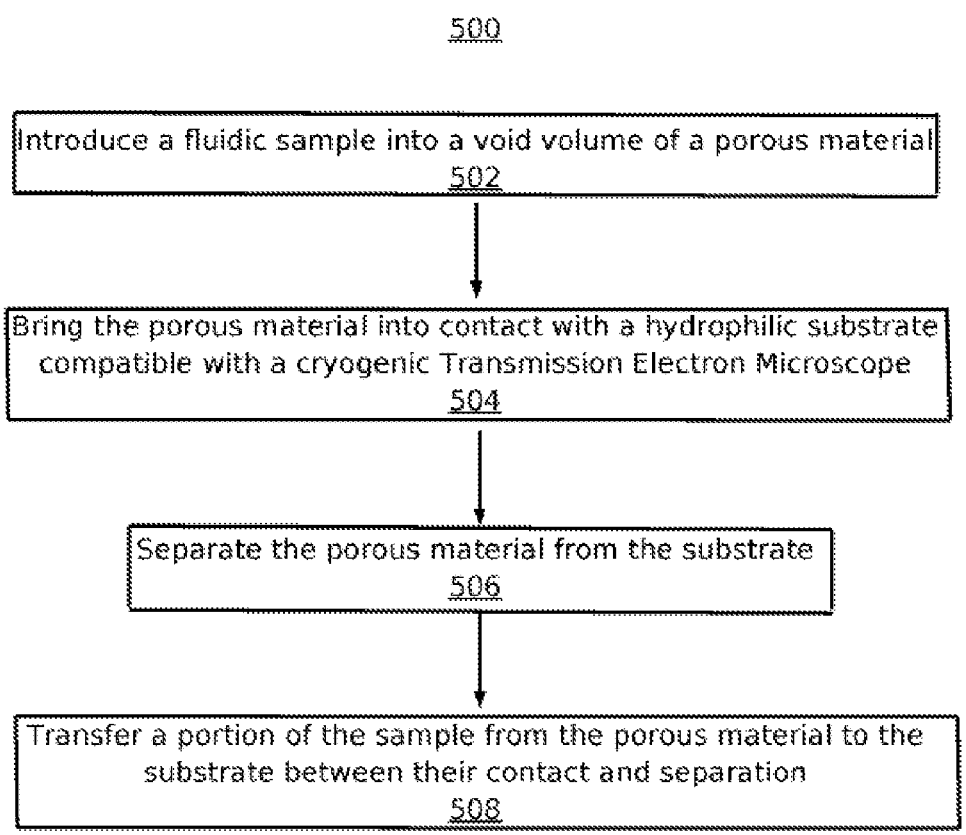
FIG. 5 is a flow diagram.

As shown in FIG. 5, an exemplary process 500 includes introducing (502) a fluidic sample into and/or onto a porous material.

Process 500 brings (504) the porous material into contact with a hydrophilic substrate compatible with a cryogenic Transmission Electron Microscope.

Process 500 separates (506) the porous material from the substrate.

Process 500 transfers (508) a portion of the sample from the porous material to the substrate between their contact and separation.

Figure 6:
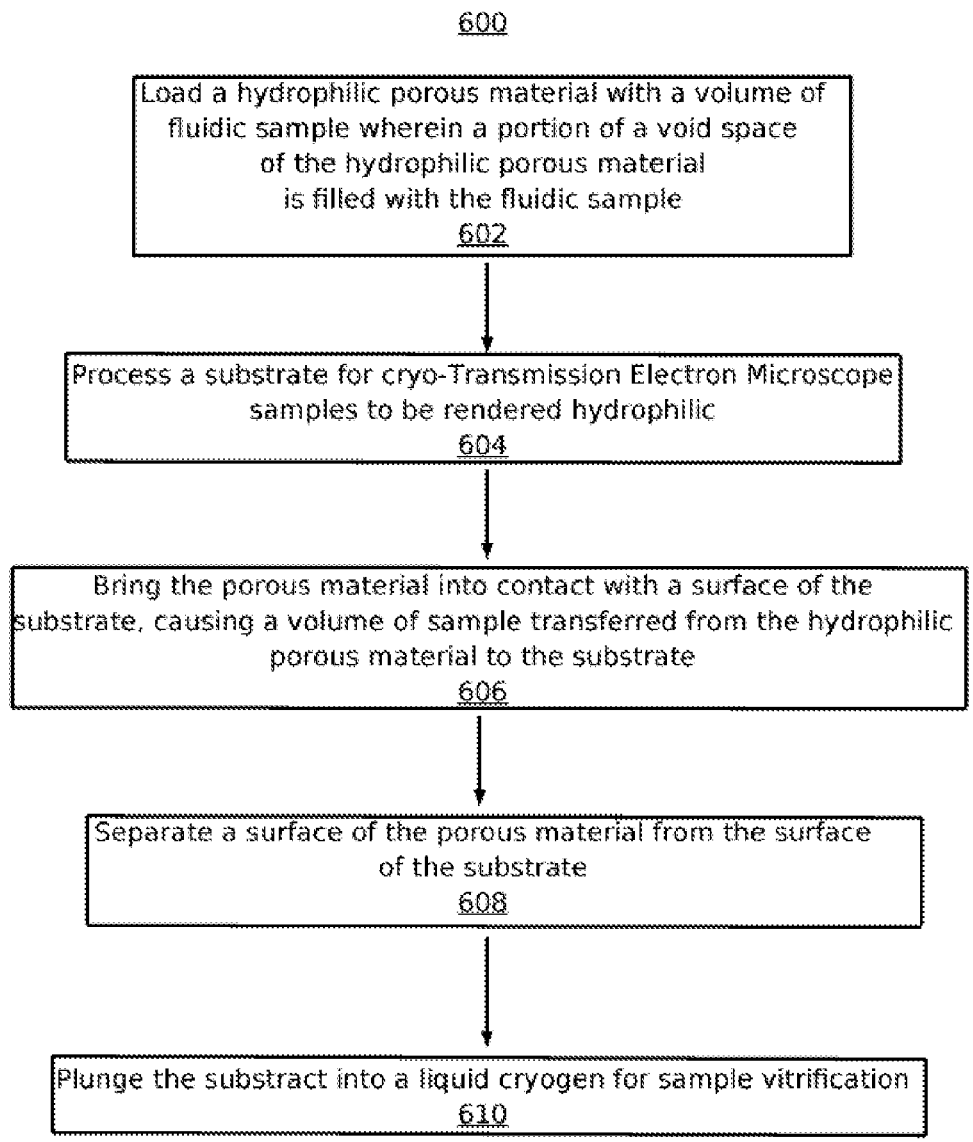
FIG. 6 is a flow diagram.

As shown in FIG. 6, another exemplary process 600 includes loading (602) a hydrophilic porous material with a volume of fluidic sample wherein the fluidic sample fills a portion of a void space and covers part of the surface of the hydrophilic porous material.

Process 600 processes (604) a substrate for cryo-Transmission Electron Microscope samples to be rendered hydrophilic.

Process 600 brings (606) the porous material into contact with a surface of the substrate, causing a volume of sample transferred from the hydrophilic porous material to the substrate.

Process 600 separates (608) a surface of the porous material from the surface of the substrate.

Process 600 plunges (610) the substrate into a liquid cryogen for sample vitrification.

Figure 7:
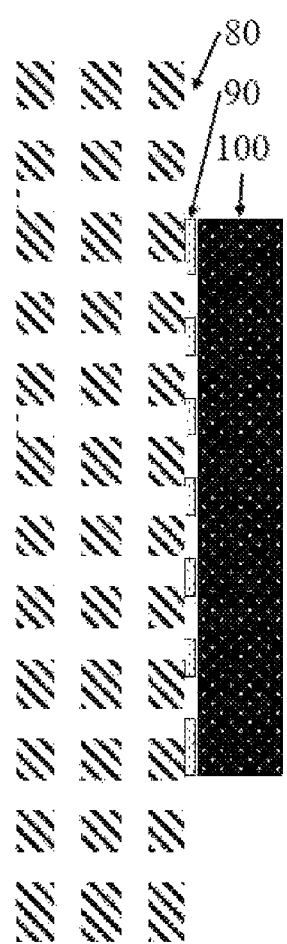
FIG. 7 is a side view showing the TEM grid in contact with the surface of the porous material.

In FIG. 7 a porous material, 80, is depicted in two dimensions as a material with channels running parallel through the thickness and the length of the material. Porous materials can be modeled as a material with a series of channel through which fluid flows, and to describe this invention, are depicted here as such rather than a complex three dimensional material. In this initial state the pores are empty, filled with ambient air. FIG. 7 depicts the porous material as a flat sheet, however the present invention applies equally to any geometry of porous material. A carbon film 90 is attached to the TEM substrate 100. The carbon film and TEM substrate are rendered hydrophilic. The surface of the TEM grid is brought into contact with a surface of the porous material. The TEM grid can be brought into contact with the porous material in any direction, whether normally, perpendicularly or in shear, or at any angle. It is depicted here as a flat sheet of porous material with its flat surface contacting the TEM grid, however this invention is equally applicable to any contact type, such as the edge of the porous material contacting the substrate.

Figure 8:
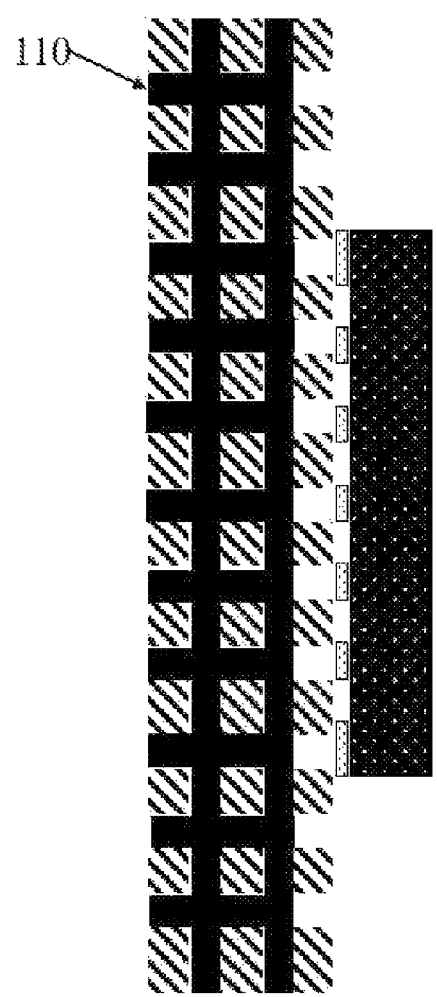
FIG. 8 is a side view showing sample volume wicking into and filling the pore volume of the porous material.

In FIG. 8, a volume of fluidic sample 110 is deposited into the porous material. The sample wicks through the pores of the pore matrix and fills some portion of the pore space.

Figure 9:
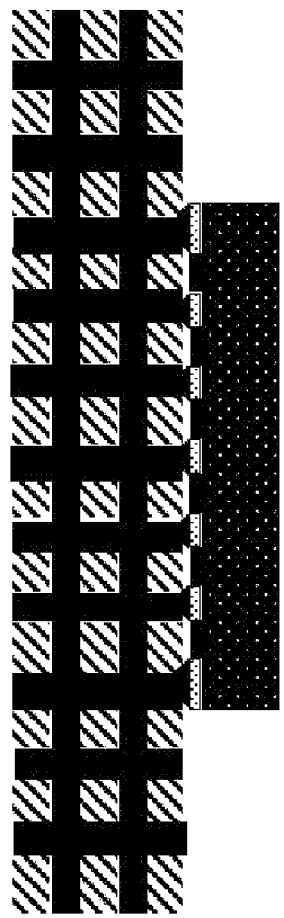
FIG. 9 is a side view showing the sample having wicked through the porous material and into contact with the TEM grid and wicking across the surface and into the pores of the substrate.

In FIG. 9, the sample has wicked through the porous material and made contact and spread onto the surface of the TEM grid. The sample volume is shown as approximately equal to the pore space, however the present invention is equally applicable to any sample volume up to the volume of the pore space (i.e. 100% of pore space filled, material is saturated) or even larger (porous material is over-saturated).

Figure 10:
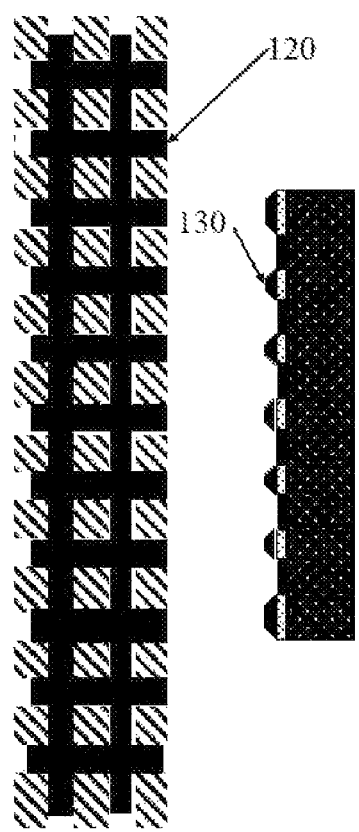
FIG. 10 a side view showing the TEM grid with sample volume deposited on the surface and in its pores moved out of contact with the surface of the porous material.

In FIG. 10, the TEM grid is separated from the porous material at which point it is plunged into liquid cryogen. The sample volume in the porous material 120 is now less than the sample volume that was deposited, as a portion has been transferred to the TEM grid 130. The objective is to transfer ~100's pL to ~1 nL of sample to the TEM grid to achieve appropriate sample layer thickness for vitrification. It should be noted that volumes depicted being transferred in the figures may be exaggerated and are for conceptual understanding only. The present invention does apply equally to any sized geometry of porous material, material porosity, porous material type, void space volume, sample volume and so forth. Additionally, sample volume 130 is depicted as having a uniform thickness across the carbon film and pore in the film, however the present invention will often lead to variation in the sample thickness across the grid. Furthermore, the TEM grid is shown being separated from the porous material perpendicular to the porous material surface, however the TEM grid can also be separated parallel to the surface of the porous material, namely at high speeds into liquid cryogen to minimize the amount of time between separation and sample vitrification.

Figure 11:
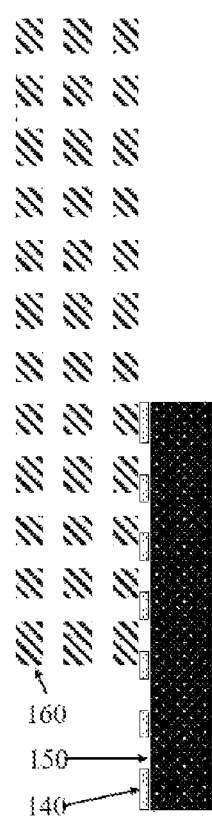
FIG. 11 is a side view showing the TEM grid in contact with the porous material with a region of the TEM grid open to the environment.

In FIG. 11, the carbon film 140 and TEM substrate 150 are in contact with the porous material 160 and an area of the TEM grid (carbon film assembled with the substrate) is open to the environment. The carbon film and TEM substrate are both rendered hydrophilic.

Figure 12:
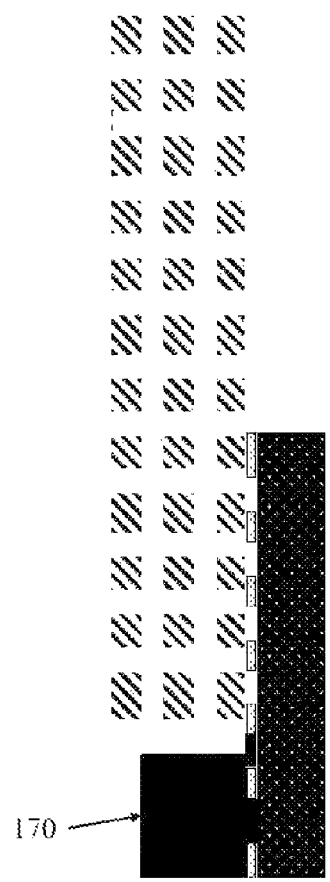
FIG. 12 is a side view showing sample volume deposited onto the sample substrate surface and the sample wicking across the surface and into the pores of the substrate.

In FIG. 12, sample volume 170 is deposited onto the open surface of the TEM grid. The sample may be deposited onto the TEM grid solely, as depicted, or it may also be deposited at the point of the TEM grid where the porous material begins.

Figure 13:
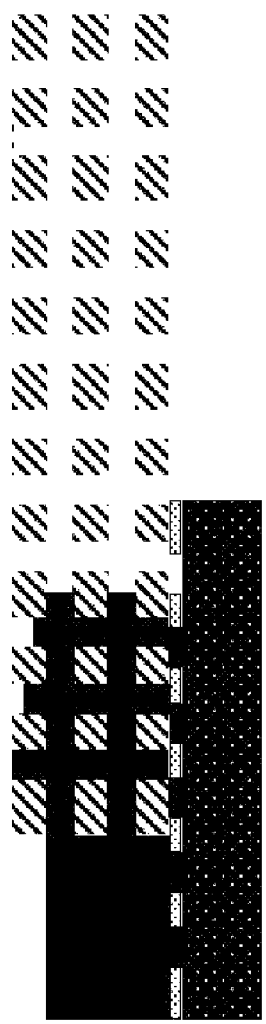
FIG. 13 shows sample wicking progressively through the porous material, along the surface of the substrate and into its pores and between the porous material and substrate.

In FIG. 13, the sample volume has spread across the hydrophilic surface of the TEM grid and been wicked into the pore space of the porous material and between the TEM grid and the porous material.

Figure 14:
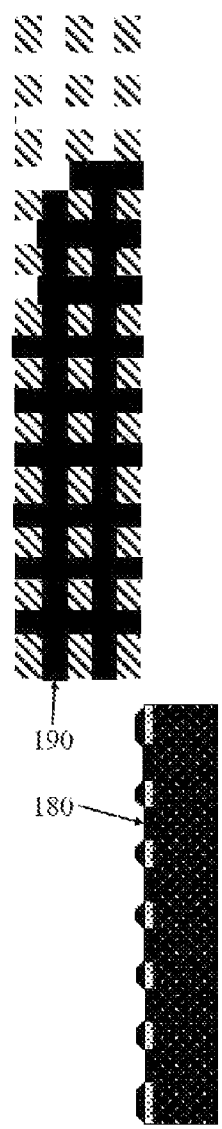
FIG. 14 shows the TEM grid with deposited sample volume moved out of contact with the porous material.

In FIG. 14, the TEM grid has sheared out of contact with the porous material. The appropriate volume of sample for vitrification 180 has been transferred to the TEM grid, after having been sheared away from the volume in the porous material 190 and the TEM grid is plunged into liquid cryogen to vitrify the sample. The shear motion that separates the TEM grid and porous material also drives the grid into the liquid cryogen, minimizing the time between air/water interface creation of the sample on the grid and vitrification through entry to the liquid cryogen, however normal/perpendicular separation also works.

Figure 15:
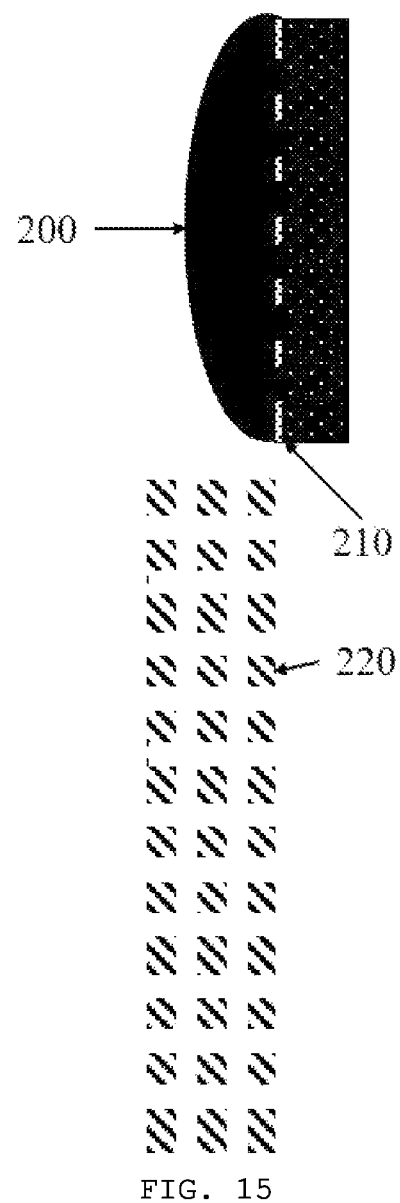
FIG. 15 shows the TEM grid with sample deposited on the surface and porous material with its surface parallel to the grid and in a coincident plane to the surface of the grid.

In FIG. 15, fluidic sample 200 is deposited onto the surface of a hydrophilic TEM grid 210, the surface of which is coincident along a surface of a hydrophilic porous material 220.

Figure 16:
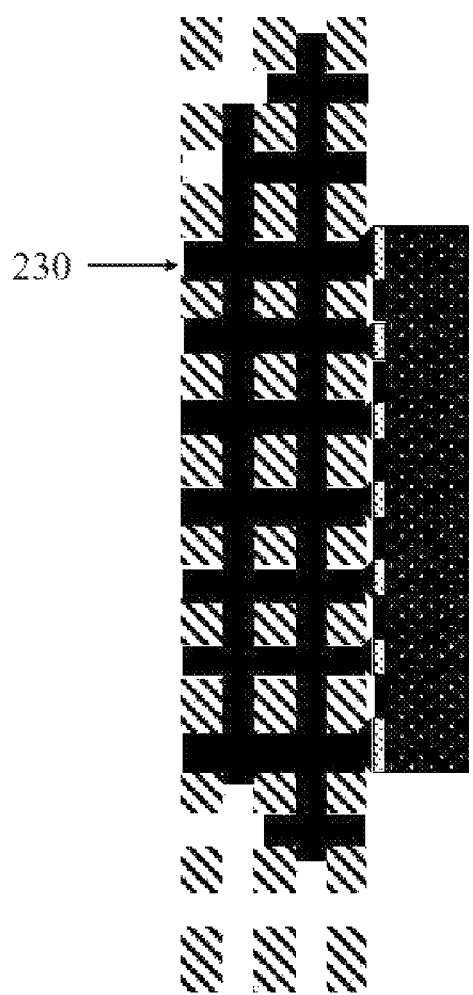
FIG. 16 shows the TEM grid moving parallel to the porous material and into contact with the porous material and the fluidic sample wicking into the porous material.

In FIG. 16, the TEM grid moves parallel to the surface of the porous material and into contact with it and the fluidic sample wicks into the porous material 230.

Figure 17:
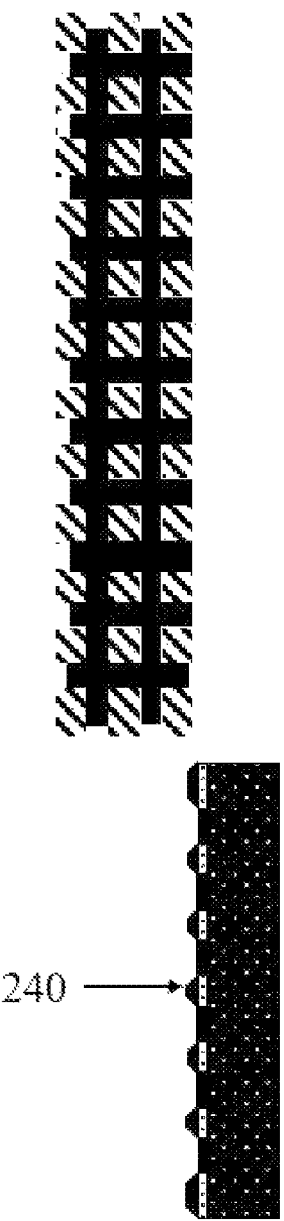
FIG. 17 shows the TEM grid moving out of contact with the porous material in a motion parallel to the porous material.

In FIG. 17, the TEM grid has moved out of contact with the porous material parallel to the surface of the porous material, which has left the appropriate sample volume on the TEM grid 240 for sample vitrification. The grid is plunged into liquid cryogen.

Figure 18:
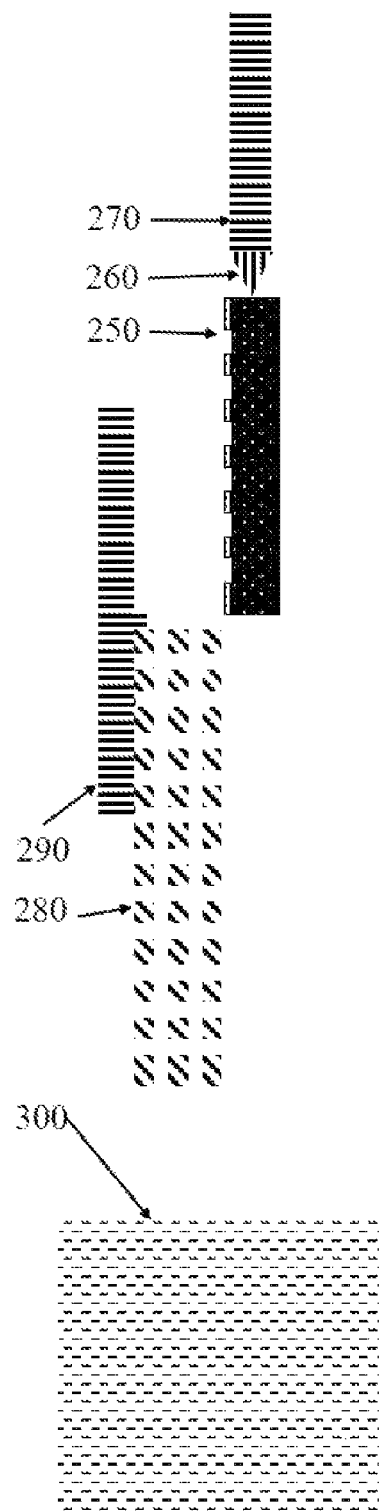
FIG. 18 shows the TEM grid held fixed by a mechanism bound to a carriage controlling its and the grid's motion and a porous material fixed to a carriage controlling its motion, all above a liquid cryogen pool.

In FIG. 18, the hydrophilic TEM grid 250 is held by a mechanism 260 that is attached to a grid carriage 270, The mechanism holds the TEM grid and the mechanism is fixed to the grid carriage 270 such that the TEM grid is moved only through the motion of the grid carriage 270. A hydrophilic porous material 280 is mounted to a porous material carriage 290 such that it is moved only through motion of the porous material carriage 290. Both the TEM grid and the porous material are located above a liquid cryogen bath 300.

Figure 19:
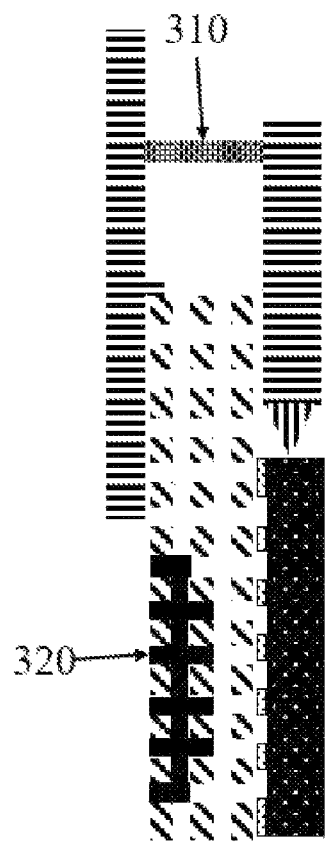
FIG. 19 shows the grid carriage moving the grid into contact with the surface of the porous material, the grid carriage and porous material carriage locking into place to ensure synchronous motion of the two, and sample being introduced into the porous material.
Figure 19:
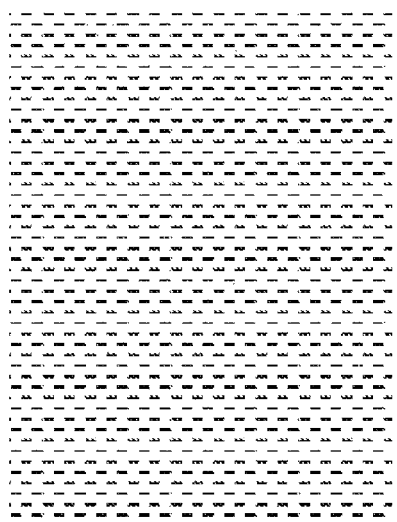

In FIG. 19, the TEM grid is guided into contact with the porous material through movement of the grid carriage 270. The relative motion of the TEM grid carriage 270 and the porous material carriage 290 is then locked with a mechanism 310, such that the TEM grid and porous material move in synchrony. A fluidic sample 320 is introduced into the porous material and wicks through the porous material.

Figure 20:
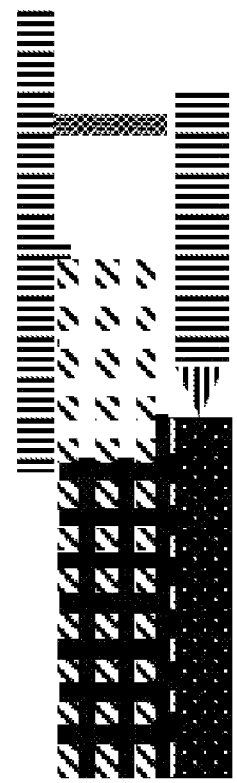
FIG. 20 shows the sample wicked into the porous material and into contact with the TEM grid and into the pores of the substrate.
Figure 20:
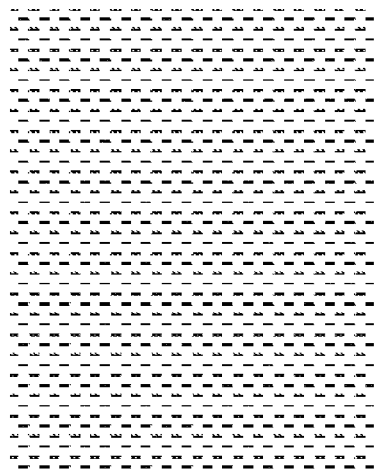

In FIG. 20, the fluidic sample has wicked further through the porous material and also into contact with the TEM grid and spread across the TEM grid.

Figure 21:
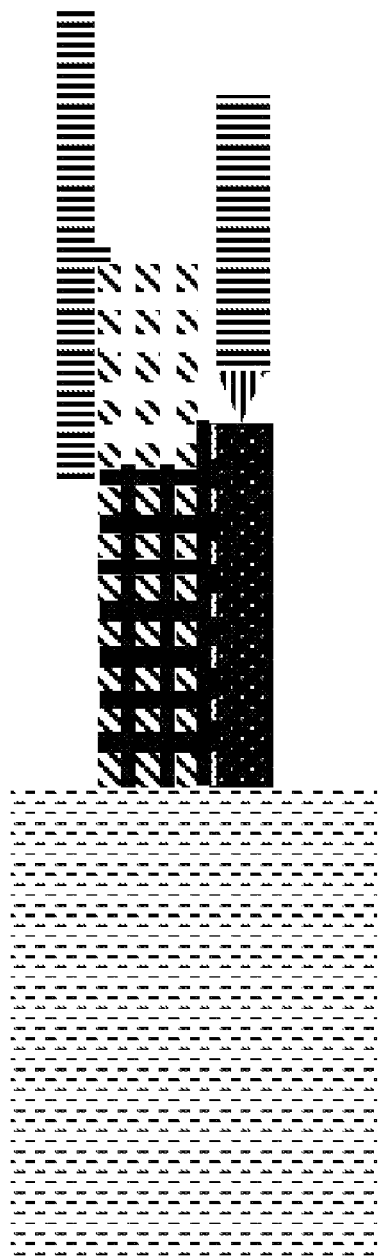
FIG. 21 shows the grid and porous material moving in synchrony to where the leading edge of the porous material is at the liquid cryogen surface, and the unlocking of the two carriages to allow independent motion of the porous material and grid.

In FIG. 21, the TEM grid and porous material are plunged in synchrony towards the liquid cryogen. The timing of this plunge can vary, where the plunge could have already commenced at the time of the introduction of the fluidic sample. The leading edge of the porous material reaches the furthest point it can plunge without entering the liquid cryogen. The lock synchronizing the porous material and grid carriages is unlocked allowing for independent motion.

Figure 22:
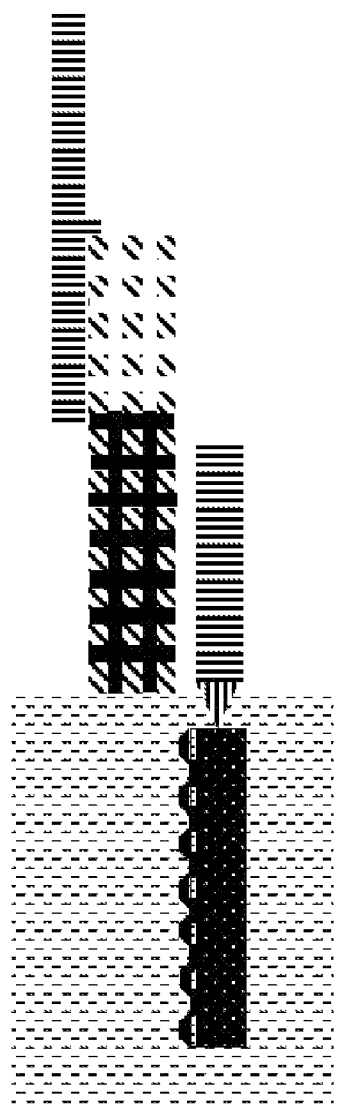
FIG. 22 shows the porous material stopped with its leading edge at the surface of the liquid cryogen and the TEM grid plunged into the liquid cryogen, having sheared the appropriate amount of fluid for vitrification onto itself when separating from the porous material.

In FIG. 22, the porous material is stopped immediately before entering the liquid cryogen and the TEM grid continues plunging into the liquid cryogen, shearing the fluid between the TEM grid and the porous material as they separate, transferring the appropriate volume of sample to the TEM grid for vitrification and creating the sample air/water interface immediately before entering the liquid cryogen. This invention also allows for the unsynchrony of the carriages and top of the porous material before reaching the interface of the liquid cryogen, or even after the surface where the TEM grid and porous material separate in the cryogen.

The process described in FIGS. 18-22 can also be carried out where the introduction of the sample occurs as described in FIGS. 11-14, where at the time of locking and synchronizing the motion of the two carriages the TEM grid has some area from of contact with the porous material and the fluidic sample is deposited onto that area and sample spread occurs as called out in those figures. The grid and porous material motion and separation of the grid and porous material is still performed as described in FIGS. 18-22.

Figure 23:
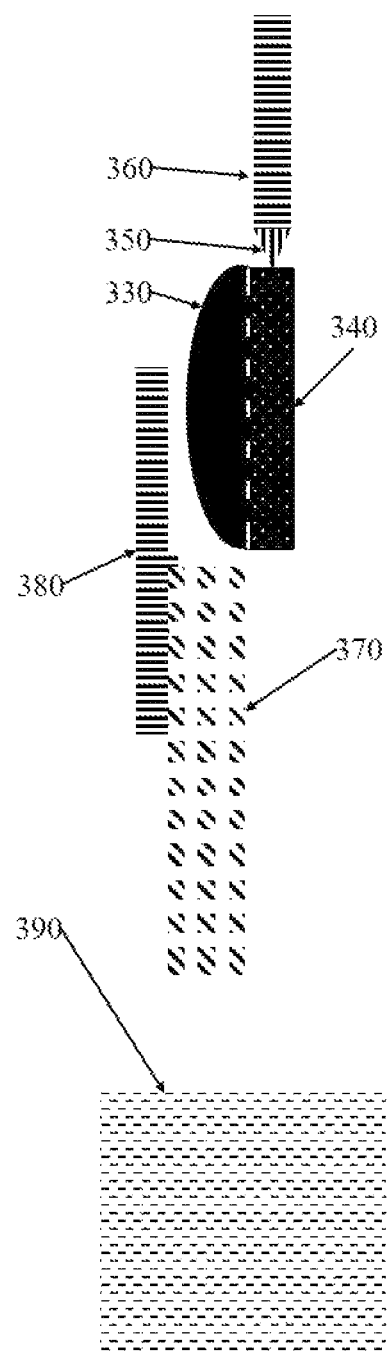
FIG. 23 shows fluidic sample deposited onto a TEM grid being held by a mechanism fixed to a carriage and a porous material fixed to a carriage, all above a liquid cryogen bath.

In FIG. 23 a fluid sample 330 is deposited onto a hydrophilic TEM grid 340. The TEM grid is held by a mechanism 350 which is mounted to a grid carriage 360 such that the TEM grid is moved only through carriage motion. A porous material 370 is mounted to a porous material carriage 380 such that the porous material is moved only through carriage motion. Both the porous material and TEM grid are above a liquid cryogen bath 390.

Figure 24:
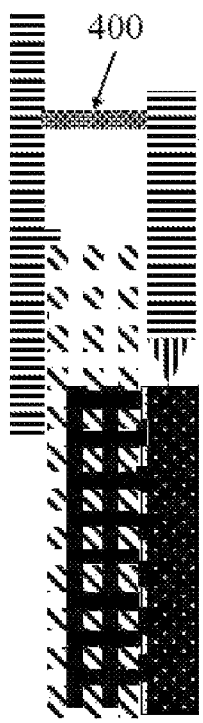
FIG. 24 shows the grid moved into contact with the surface of the porous material, and fluid wicking into the pores of the material, and the grid and porous material carriages locked into synchronous motion.
Figure 24:
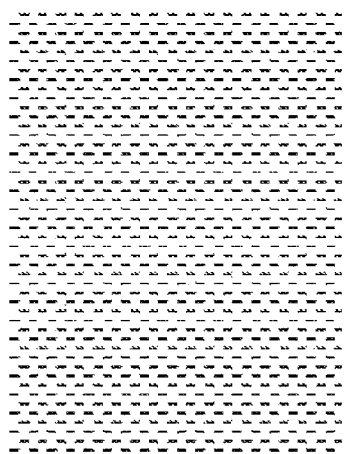

In FIG. 24 the TEM grid is brought into contact with the porous material and the sample wicks into the porous material. The carriages 360, 380 carrying the porous material and the TEM grid are then locked with a mechanism 400 such that the TEM grid and porous material move in synchrony.

Figure 25:
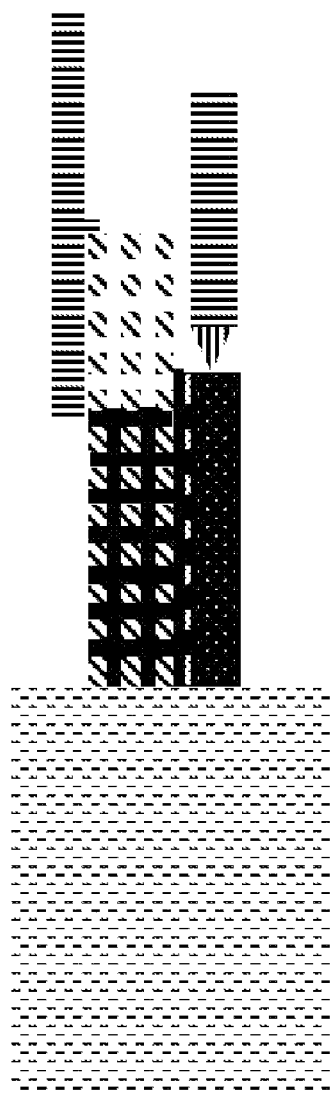
FIG. 25 shows the sample wicking into contact with the surface of the TEM grid, the grid and porous material plunging down to where the leading edge of the porous material is at the liquid cryogen surface, and the two carriages then being unlocked to allow independent motion.

In FIG. 25 the porous material and TEM grid plunge towards the liquid cryogen bath and upon reaching the surface of the cryogen the mechanism locking the two carriages is released allowing for independent motion of the TEM grid and porous material.

Figure 26:
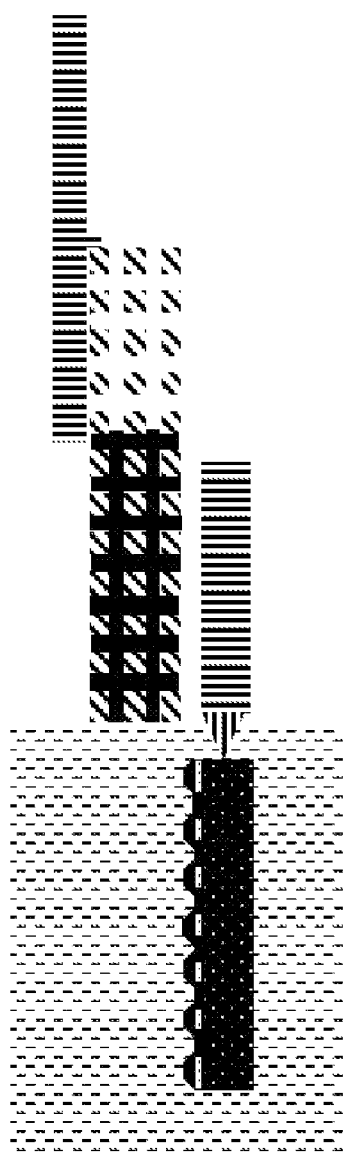
FIG. 26 shows the porous material stopped with its leading edge at the surface of the liquid cryogen and the TEM grid plunged into the liquid cryogen, having sheared the appropriate amount of fluid for vitrification onto itself when separating from the porous material.

In FIG. 26 the leading edge of the porous material stops right at the surface of the liquid cryogen and the TEM grid continues plunging into the liquid cryogen. The separation of the porous material and TEM leads to a shearing of the fluid sample between the grid and porous material, leaving the appropriate volume of sample on the TEM grid for vitrification, and creating a new air/water interface of the sample on the grid just before entering the liquid cryogen. The separation of the carriages and stopping of the porous material can also occur before the surface of the liquid cryogen, or after entry to the liquid cryogen.

The process detailed in FIGS. 23-26 can also occur where the TEM grid and porous material were not in contact when the two carriages are locked. The TEM grid with sample deposited and the porous material plunge in synchrony towards the liquid cryogen with the grid being above the porous material. The carriages are unlocked when the porous material leading edge reaches the surface of the liquid cryogen, and the grid continues plunging by the stopped porous material, sample wicks into the porous material, leaving enough sample on the grid for vitrification as the grid continues into the liquid cryogen vitrifying the sample.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:
1. A method comprising:
  bringing a porous material into contact with a hydrophilic substrate compatible with a cryogenic Transmission Electron Microscope;
  introducing a fluidic sample onto and/or into the hydrophilic porous material;

allowing for wicking of the fluidic sample through the porous material and into contact with the hydrophilic substrate;

separating the porous material from the substrate; and plunging the substrate into liquid cryogen for sample vitrification.

2. The method in claim 1 where the porous material is separated from the substrate and the substrate is plunged into liquid cryogen in the same action.

3. A method comprising:

bringing a hydrophilic substrate compatible with cryogenic Transmission Electron Microscopy into contact with a porous material;

orienting the porous material and substrate such that a section of the substrate surface is not in contact with the porous material and open to the environment;

introducing fluidic sample onto the open substrate surface;

allowing for the sample to wick along the surface of the substrate, into the porous material and between the substrate and porous material; and plunging the substrate out of contact with the porous material and into a liquid cryogen, vitrifying the sample.

4. A method comprising:

introducing a fluidic sample onto a hydrophilic substrate compatible with cryogenic Transmission Electron Microscopy;

bringing the substrate into contact with a porous material with low enough force acting on the substrate that it can be separated from the porous material at high shear speeds without damaging the substrate;

allowing for the sample to wick away from the substrate, into the porous material; and shearing the substrate out of contact with the porous material and into a liquid cryogen, vitrifying the sample.

5. The method from claim 4 where the action of bringing the substrate into contact with the porous material and shearing out of contact with the porous material are carried out in the same action.

6. A method comprising:

attaching a porous material onto a porous material carriage, where the porous material is fixed and positioning is manipulated by the porous material carriage;

holding a hydrophilic TEM substrate with a mechanism such that it is parallel to a surface of the porous material and that surface of the porous material is in the same plane as the TEM substrate, wherein the mechanism holding the TEM substrate is fixed to a grid carriage that controls motion of the TEM substrate;

maintaining the ability to lock the porous material carriage holding the porous material and the grid carriage holding the TEM substrate such that they can move both in synchronization, without any relative motion to each other, but also independently as needed;

positioning the TEM substrate such that its surface is partially or fully in contact with the surface of the porous material;

introducing a fluidic sample through an opposing surface of the porous material that is opposite the surface in plane with the TEM substrate and allowing the fluid to wick through the porous material and into contact with and onto the surface of the TEM substrate;

plunging the TEM substrate and porous material in synchronized motion towards a liquid cryogen;

stopping the motion of the porous material at a surface of the liquid cryogen, breaking synchronized motion with the TEM substrate, and allowing the TEM substrate to move independently; and plunging the TEM substrate into the liquid cryogen and vitrifying the fluid sample.

7. A method comprising:

attaching a porous material onto a porous material carriage, where the porous material is fixed and positioning is manipulated by the porous material carriage;

holding a hydrophilic TEM substrate with a mechanism such that it is parallel to a surface of the porous material and that surface of the porous material is in the same plane as the TEM substrate, wherein the mechanism holding the TEM substrate is fixed to a grid carriage that controls motion of the TEM substrate;

maintaining the ability to lock the porous material carriage holding the porous material and the grid carriage holding the TEM substrate such that they can move both in synchronization, without any relative motion to each other, but also be unlocked to move independently as needed;

depositing a volume of the fluidic sample onto a surface of the TEM substrate that is in the same plane as the surface of the porous material;

plunging the TEM substrate and porous material in synchronized motion towards a liquid cryogen;

stopping the motion of the porous material at a surface of the liquid cryogen, breaking synchronized motion with the TEM substrate, and allowing the TEM substrate to move independently; and plunging the TEM substrate by the porous material, which wicks some volume of the sample away from the TEM substrate, and into the liquid cryogen and vitrifying the fluid sample.

* * * * *

UNITED STATES PATENT AND TRADEMARK OFFICE
CERTIFICATE OF CORRECTION

PATENT NO. : 11,703,429 B2
APPLICATION NO. : 17/346758
DATED : July 18, 2023
INVENTOR(S) : Michael Godfrin et al.

It is certified that error appears in the above-identified patent and that said Letters Patent is hereby corrected as shown below:

In the Specification

Column 5, Line 22 reads:
"behind with a thickness of 100 nm, with the optimal layer"
Should read:
--behind with a thickness of $\leq$ 100 nm, with the optimal layer--

Column 6, Line 14 reads:
"particle cryo-EM, each biomacromolecule particle (often a"
Should read:
--particle cryo-TEM, each biomacromolecule particle (often a--

Column 8, Line 53 reads:
"used to thin fluidic samples prior to vitrification for cryoEM"
Should read:
--used to thin fluidic samples prior to vitrification for cryo-TEM--

Column 8, Line 62 reads:
"volume used is typically 3 uL. With this invention an order"
Should read:
--volume used is typically ~3 uL. With this invention an order--

Signed and Sealed this
Thirteenth Day of February, 2024

Katherine Kelly Vidal
*Director of the United States Patent and Trademark Office*